United States Patent
Inose et al.

(10) Patent No.: US 10,473,241 B2
(45) Date of Patent: Nov. 12, 2019

(54) THREADED JOINT FOR STEEL PIPES

(71) Applicants: NIPPON STEEL & SUMITOMO METAL CORPORATION, Tokyo (JP); VALLOUREC OIL AND GAS FRANCE, Aulnoye-Aymeries (FR)

(72) Inventors: Keita Inose, Amagasaki (JP); Fumio Ota, Wakayama (JP); Shin Ugai, Wakayama (JP); Masaaki Sugino, Nishinomiya (JP)

(73) Assignees: NIPPON STEEL CORPORATION, Tokyo (JP); VALLOUREC OIL AND GAS FRANCE, Aulnoye-Aymeries (FR)

( * ) Notice: Subject to any disclaimer, the term of this patent is extended or adjusted under 35 U.S.C. 154(b) by 564 days.

(21) Appl. No.: 15/102,898

(22) PCT Filed: Jan. 9, 2015

(86) PCT No.: PCT/JP2015/000076
§ 371 (c)(1),
(2) Date: Jun. 9, 2016

(87) PCT Pub. No.: WO2015/105054
PCT Pub. Date: Jul. 16, 2015

(65) Prior Publication Data
US 2016/0305585 A1    Oct. 20, 2016

(30) Foreign Application Priority Data
Jan. 9, 2014    (JP) ................. 2014-002614

(51) Int. Cl.
*F16L 15/06*    (2006.01)
*E21B 17/042*    (2006.01)

(52) U.S. Cl.
CPC ............ *F16L 15/06* (2013.01); *E21B 17/042* (2013.01); *F16L 2201/40* (2013.01)

(58) Field of Classification Search
CPC ...................................................... F16L 15/06
(Continued)

(56) References Cited

U.S. PATENT DOCUMENTS

| 2,062,407 A | 12/1936 | Eaton |
| 4,795,200 A | 1/1989 | Tung |

(Continued)

FOREIGN PATENT DOCUMENTS

| JP | 62-196488 | 8/1987 |
| JP | 02-80886 | 3/1990 |

(Continued)

*Primary Examiner* — Anna M Momper
*Assistant Examiner* — Fannie C Kee
(74) *Attorney, Agent, or Firm* — Clark & Brody

(57) ABSTRACT

The load flanks in the male threaded portion of the pin and the load flanks in the female threaded portion of the box have a flank angle of less than 0 degrees. The female threaded portion is divided into, in order from near the seal surface, an incomplete thread section and a complete thread section. In the female threaded portion, over the entire area including the two thread sections, roots collectively define a single tapered periphery. The incomplete thread section has a length of at least three times the thread pitch and has a thread height lower than a thread height of the complete thread section. The shoulder surfaces are in contact with each other, the seal surfaces are in contact with each other, and in the incomplete thread section, clearances are provided between the roots of the male threaded portion and the crests of the female threaded portion.

8 Claims, 12 Drawing Sheets

(58) Field of Classification Search
USPC .............................. 285/333–334, 355, 390
See application file for complete search history.

(56) References Cited

U.S. PATENT DOCUMENTS

| | | | |
|---|---|---|---|
| 2004/0262919 A1 | 12/2004 | Dutilleul et al. | |
| 2005/0093250 A1* | 5/2005 | Santi | E21B 17/042 277/602 |
| 2010/0270793 A1* | 10/2010 | Takano | F16L 15/00 285/333 |

FOREIGN PATENT DOCUMENTS

| | | |
|---|---|---|
| JP | 02-271191 | 11/1990 |
| JP | 06-331070 | 11/1994 |
| JP | 10-89555 | 4/1998 |
| WO | 2004/109173 | 12/2004 |
| WO | 2006/022418 | 3/2006 |
| WO | 2007/114460 | 10/2007 |

* cited by examiner

Prior Art

Prior Art

THREADED JOINT FOR STEEL PIPES

TECHNICAL FIELD

The present invention relates to a threaded joint for use in connecting steel pipes.

BACKGROUND ART

In oil wells, natural gas wells, and the like (hereinafter also collectively referred to as "oil wells"), oil country tubular goods for casings, tubings or the like, which are steel pipes and are sequentially connected to one another by threaded joints, are used. Generally, threaded joints for steel pipes for such use are classified into two types: coupling-type joints and integral-type joints.

A coupling-type threaded joint is constituted by a pair of tubular goods that are to be connected to each other, of which one is a steel pipe and the other is a coupling. In this case, the steel pipe is provided with a male threaded portion formed on the outer periphery at each end thereof, and the coupling is provided with a female threaded portion formed on the inner periphery at each end thereof. The male threaded portion of the steel pipe is screwed into the female threaded portion of the coupling, thereby making up a joint and connecting them. An integral-type threaded joint is constituted by a pair of steel pipes as tubular goods that are to be connected to each other, without a separate coupling being used. In this case, each steel pipe is provided with a male threaded portion formed on the outer periphery at one end thereof and a female threaded portion formed on the inner periphery at the other end thereof. The male threaded portion of one of the steel pipes is screwed into the female threaded portion of the other of the steel pipes, thereby making up a joint and connecting them.

In general, the joint portion at the tubular end where a male threaded portion is formed is referred to as a pin because it includes an element that is inserted into a female threaded portion. On the other hand, the joint portion at the tubular end where a female threaded portion is faulted is referred to as a box because it includes an element that receives a male threaded portion. A pin and a box both have a tubular shape because they are constituted by end portions of tubular goods.

FIG. 1 is a sectional view of a threaded joint for steel pipes, showing an example of its overall configuration. The threaded joint illustrated in FIG. 1 is a coupling-type threaded joint and is constructed of a pin 10 and a box 20.

The pin 10 includes, in order from a free end of the pin toward the tubular body, a shoulder surface 17, a seal surface 16, and a male threaded portion 11. The seal surface 16 is a tapered surface. To be exact, the seal surface 16 is a surface constituted by the peripheral surface of a truncated cone having a diameter decreasing toward the end, or a surface constituted by a combination of the peripheral surface of the truncated cone and the peripheral surface of a solid of revolution that can be obtained by rotating a curved line such as an arc about the pipe axis CL. The shoulder surface 17 is an annular surface extending radially substantially perpendicular to the pipe axis CL. To be exact, it is a slightly inclined surface with the outer circumferential side being closer to the end of the pin 10.

The box 20 includes, in order from the body of the box toward an end of the box, a shoulder surface 27, a seal surface 26, and a female threaded portion 21. The shoulder surface 27, the seal surface 26, and the female threaded portion 21 are located so as to correspond to the shoulder surface 17, the seal surface 16, and the male threaded portion 11 of the pin 10. The male threaded portion 11 of the pin 10 and the female threaded portion 21 of the box 20 are tapered threaded portions with trapezoidal threads that mate with each other.

The male threaded portion 11 and the female threaded portion 21 are threadedly engageable with each other, and in a made-up state, they mate in intimate contact with each other and have an interference fit. The seal surfaces 16, 26 are brought into contact with each other by the screwing of the pin 10, and in a made-up state, they mate in intimate contact with each other to have an interference fit, thereby forming a seal therebetween with metal-to-metal contact. The shoulder surfaces 17, 27 are brought into contact and pressed against each other by the screwing of the pin 10 onto the box 20, and serve as stoppers for restricting the screwing of the pin 10. Furthermore, in a made-up state, the shoulder surfaces 17, 27 serve to impart, to the male threaded portion 11 of the pin 10, a load in a direction opposite (backward) to the screwing direction (forward), i.e., so-called thread tightening axial force.

With a threaded joint having this configuration, good sealing performance is ensured because of the seal provided by the mating and intimate contact between the seal surfaces 16, 26.

In recent years, oil well environments have increasingly become deep-underground or ultra deep-water environments, and accordingly have become harsh environments with high temperatures, high pressures, and high corrosivity. For such harsh environments, steel pipes of the heavy wall type are mostly used. A threaded joint for connecting such steel pipes is required to have high joint strength such as resistance to tensile forces, resistance to compressive forces, and the like, and in addition, required to provide excellent sealing performance against internal pressure and external pressure.

One method for enhancing the sealing performance of a threaded joint is to generate high contact pressure between the seal surfaces. Conventionally, in order to increase contact pressure between the seal surfaces, the technique of increasing the interference fit between the seal surfaces is utilized. In addition, in order to prevent the mating and intimate contact of the threads from causing a decrease in contact pressure between the seal surfaces, the technique of relieving the mating and intimate contact of the threads exclusively in regions near the seal surfaces is utilized (see, for example, U.S. Pat. No. 2,062,407 (Patent Literature 1), Japanese Patent Application Publication No. H02-80886 (Patent Literature 2), Japanese Patent Application Publication No. S62-196488 (Patent Literature 3), and Japanese Patent Application Publication No. H10-89555 (Patent Literature 4)).

FIG. 2 is a sectional view of a conventional threaded joint for steel pipes disclosed in Patent Literatures 1 and 2, showing a configuration of regions near its seal surfaces. In the conventional threaded joint shown in FIG. 2, in a made-up state, the male threaded portion 11 of the pin 10 and the female threaded portion 21 of the box 20 mate in intimate contact with each other, and the load flanks 15 of the male threaded portion 11 are in contact with the load flanks 24 of the female threaded portion 21 and receive the axial tightening force while the roots 13 of the male threaded portion 11 are in contact with the crests 22 of the female threaded portion 21. However, in regions near the seal surfaces 16, 26 in the threaded portions, clearances are provided between the roots 13 of the male threaded portion 11 and the crests 22 of the female threaded portion 21, so that the mating and intimate contact of the threads is relieved therein.

The load flank 15 of the male threaded portion 11 as referred to herein is the flank, of the leading and trailing flanks that constitute each thread, which is on the opposite side from the stabbing flank 14, which is in a leading position in the screwing of the male threaded portion 11 into the female threaded portion 21. The load flank 24 of the female threaded portion 21 is the flank, of the leading and trailing flanks that constitute each thread, which faces the load flank 15 of the male threaded portion 11.

In the threaded joint shown in FIG. 2, the mating and intimate contact of the threads is relieved in regions near the seal surfaces 16, 26 in the threaded portions, and therefore, when internal pressure is applied, the region near the seal surface 16 in the threaded portion of the pin 10 is expanded radially outward from the inside to cause enlargement of the diameter, whereby the contact pressure between the seal surfaces 16, 26 is amplified.

It is to be noted that, in the conventional threaded joint shown in FIG. 2, the flank angle $\theta$ of the load flanks 15 and the load flanks 24 is greater than 0 degrees. The flank angle $\theta$ refers to the angle formed by a flank with respect to a plane perpendicular to the pipe axis CL. Herein, when referring to the flank angle of load flanks, clockwise angles are designated as positive angles, and conversely, when referring to the flank angle of stabbing flanks, counterclockwise angles are designated as positive angles. When the load flank angle $\theta$ is greater than 0 degrees, application of internal pressure causes reaction force at the load flanks 15 of the pin 10 acting in a direction to contract the pin 10 radially inward from the load flank 24 of the box 20. As a result, the radially outward expansion of the pin 10 is not sufficiently caused, and therefore the amplification of the contact pressure between the seal surfaces 16, 26 cannot be satisfactorily achieved when internal pressure is applied.

FIG. 3 is a sectional view of a conventional threaded joint for steel pipes disclosed in Patent Literature 3, showing a configuration of regions near its seal surfaces. In the conventional threaded joint shown in FIG. 3 as well, in regions near the seal surfaces 16, 26 in the threaded portions, clearances are provided between the roots 13 of the male threaded portion 11 and the crests 22 of the female threaded portion 21, so that the mating and intimate contact of the threads is relieved therein. Its load flanks 15, 24 have a flank angle $\theta$ of less than 0 degrees.

In the threaded joint shown in FIG. 3, because of the load flank angle $\theta$ that is less than 0 degrees, application of internal pressure does not cause reaction force at the load flanks 15 of the pin 10 acting in a direction to contract the pin 10 radially inward. As a result, the radially outward expansion of the pin 10 is sufficiently caused, and therefore amplification of contact pressure between the seal surfaces 16, 26 can be achieved when internal pressure is applied.

In the threaded joint shown in FIG. 3, it is to be noted that, in regions near the seal surfaces 16, 26 in the threaded portions, the height of crests 12 in the male threaded portion 11 of the pin 10 decreases toward the end of the pin 10 with a steep taper angle, so that the thread height is sharply decreased toward the end. Because of this, the stiffness of the pin 10 is reduced. This causes a decrease in the deformation resistance of the pin 10 against external pressure, which results in reduced contact pressure between the seal surfaces 16, 26 when external pressure is applied. In addition, the low thread height of the male threaded portion 11 in the region near the end of the pin 10 results in reduced thread mating at the time of insertion of the pin 10 into the box 20, and this causes increased eccentricity of the pin 10. Thus, at the start of screwing of the pin 10 onto the box 20, the thread corner regions of the male threaded portion 11 of the pin 10 locally contact the female threaded portion 21 of the box 20. In the regions where such local contact occurs, the contact pressure is increased and therefore galling is more likely to occur.

Furthermore, the threaded joint shown in FIG. 3 is configured such that the roots 23 of the female threaded portion 21 of the box 20 have different taper angles. This configuration requires a complex manufacturing process, which leads to a longer manufacturing time and shorter tool life, and therefore a further problem of increased manufacturing costs arises.

The threaded joints shown in FIGS. 2 and 3 are both configured to relieve the mating and intimate contact of the threads in regions near the seal surfaces in the threaded portions, by providing clearances between the roots of the male threaded portion and the crests of the female threaded portion. As another technique for relieving the mating and intimate contact of the threads in regions near the seal surfaces, Patent Literature 4 discloses a technique of providing a circumferential groove between the female threaded portion of the box and the seal surface thereof.

However, in the threaded joint disclosed in Patent Literature 4, thread mating is reduced in regions near the seal surfaces because of the circumferential groove provided in the box. Because of this, when external pressure is applied, radial contraction of the pin easily occurs, resulting in a decrease in sealing performance against external pressure.

CITATION LIST

Patent Literature

Patent Literature 1: U.S. Pat. No. 2,062,407
Patent Literature 2: Japanese Patent Application Publication No. H02-80886
Patent Literature 3: Japanese Patent Application Publication No. S62-196488
Patent Literature 4: Japanese Patent Application Publication No. H10-89555

SUMMARY OF INVENTION

Technical Problem

As described above, conventional threaded joints have been constructed only in view of the contact pressure between the seal surfaces in a made-up state. That is, the change in contact pressure due to application of internal and external pressures is not sufficiently considered.

An object of the present invention is to provide a threaded joint for steel pipes having the following characteristics:

Improved sealing performance against internal pressure with the sealing performance against external pressure being maintained.

Solution to Problem

A threaded joint for steel pipes according to an embodiment of the present invention includes a tubular pin and a tubular box, the pin and the box being made up by screwing the pin onto the box.

The pin includes, in order from an end of the pin, a shoulder surface, a seal surface, and a male threaded portion, the male threaded portion being a tapered threaded portion with trapezoidal threads.

The box includes a shoulder surface corresponding to the shoulder surface of the pin, a seal surface corresponding to the seal surface of the pin, and a female threaded portion corresponding to the male threaded portion of the pin, the female threaded portion being a tapered threaded portion with trapezoidal threads.

The male threaded portion includes crests, roots, stabbing flanks, and load flanks, the stabbing flanks being in a leading position in the screwing of the male threaded portion into the female threaded portion, the load flanks being located opposite from the stabbing flanks.

The female threaded portion includes roots facing the crests of the male threaded portion, crests facing the roots of the male threaded portion, stabbing flanks facing the stabbing flanks of the male threaded portion, and load flanks facing the load flanks of the male threaded portion.

The load flanks of the male threaded portion and the load flanks of the female threaded portion have a flank angle that is less than 0 degrees.

The female threaded portion is composed of, in order from near the seal surface of the box, an incomplete thread section and a complete thread section.

In the female threaded portion, over an entire area thereof including the incomplete thread section and the complete thread section, the roots collectively define a single tapered periphery.

The incomplete thread section has a length along the pipe axis, the length being at least three times a thread pitch of the female threaded portion, and the incomplete thread section has a thread height lower than a thread height of the complete thread section.

In the threaded joint having such a configuration, in a made-up state: the shoulder surfaces are in contact with each other, and the seal surfaces are in contact with each other; in the complete thread section, the roots of the male threaded portion are in contact with the crests of the female threaded portion, and the load flanks of the male threaded portion are in contact with the load flanks of the female threaded portion; and in the incomplete thread section, clearances are provided between the roots of the male threaded portion and the crests of the female threaded portion, and the load flanks of the male threaded portion are in contact with the load flanks of the female threaded portion.

In the above threaded joint, the length of the incomplete thread section along the pipe axis is preferably at most eight times the thread pitch of the female threaded portion.

In the above threaded joint, the incomplete thread section may have one of the following configurations: a configuration in which the crests, starting from a boundary between the complete thread section and the incomplete thread section, collectively define a cylindrical periphery that is parallel to the pipe axis; and a configuration in which the crests, starting from the boundary, collectively define a tapered periphery inclined with respect to the pipe axis.

Alternatively, in the above threaded joint, the incomplete thread section may have a configuration in which the crests, starting from a boundary between the complete thread section and the incomplete thread section, collectively define a tapered periphery that is parallel to a tapered periphery collectively defined by the crests in the complete thread section.

Further, the above threaded joint may be configured such that, in the male threaded portion, over an entire area thereof corresponding to the incomplete thread section and the complete thread section, the crests collectively define a single tapered periphery.

Further, the above threaded joint may be configured such that:

the pin includes a nose portion disposed between the seal surface and the shoulder surface, the box includes a recessed portion corresponding to the nose portion of the pin, and in a made-up state, the nose portion of the pin is not in contact with the recessed portion of the box.

Furthermore, the above threaded joint may be configured such that:

the box includes a circumferential groove disposed between the incomplete thread section and the seal surface, the circumferential groove having a length along the pipe axis, the length being at most three times the thread pitch of the female threaded portion; and the male threaded portion of the pin extends to a location corresponding to the circumferential groove.

Furthermore, the above threaded joint may be configured such that:

the pin includes a seal surface for external pressure, the seal surface for external pressure being disposed on at least one of an end region of the male threaded portion and an intermediate region thereof, and the box includes a seal surface for external pressure corresponding to the seal surface for external pressure of the pin.

Advantageous Effects of Invention

A threaded joint for steel pipes of the present invention has the following significant advantages:

Ability to exhibit improved sealing performance against internal pressure while the sealing performance against external pressure is maintained.

DESCRIPTION OF EMBODIMENTS

The present inventors conceived of the idea that contact pressure between the seal surfaces can be increased by taking advantage of the radially outward expansion of the pin due to internal pressure, and based on this idea, they conducted finite element analysis for various modes of mating and intimate contact of the threads in the regions near seal surfaces and evaluated the sealing performances against internal pressure and external pressure. As a result, they have found that it is advantageous that, of the male threaded portion of the pin and the female threaded portion of the box that mate with each other, the female threaded portion of the box exclusively be configured to have a lower thread height in the region near the seal surface thereof to relieve the mating and intimate contact of the threads. Hereinafter, preferred embodiments of the threaded joint for steel pipes according to the present invention will be described.

Figure 1:
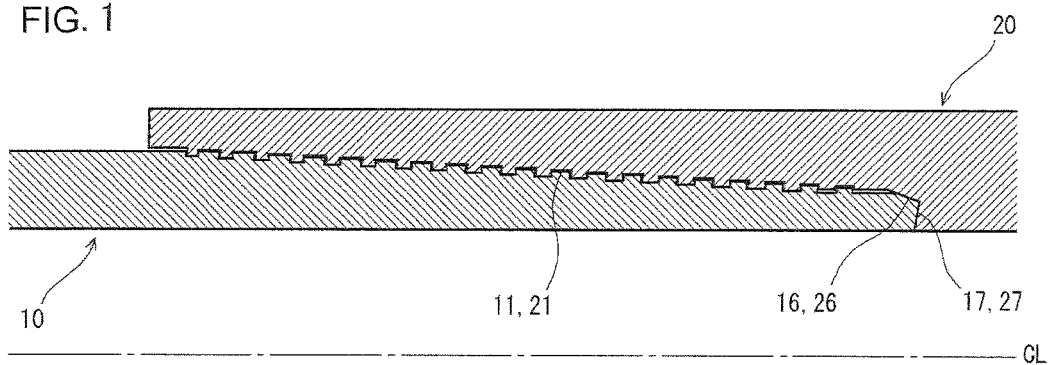
FIG. 1 is a sectional view of a threaded joint for steel pipes, showing an example of its overall configuration.
Figure 2:
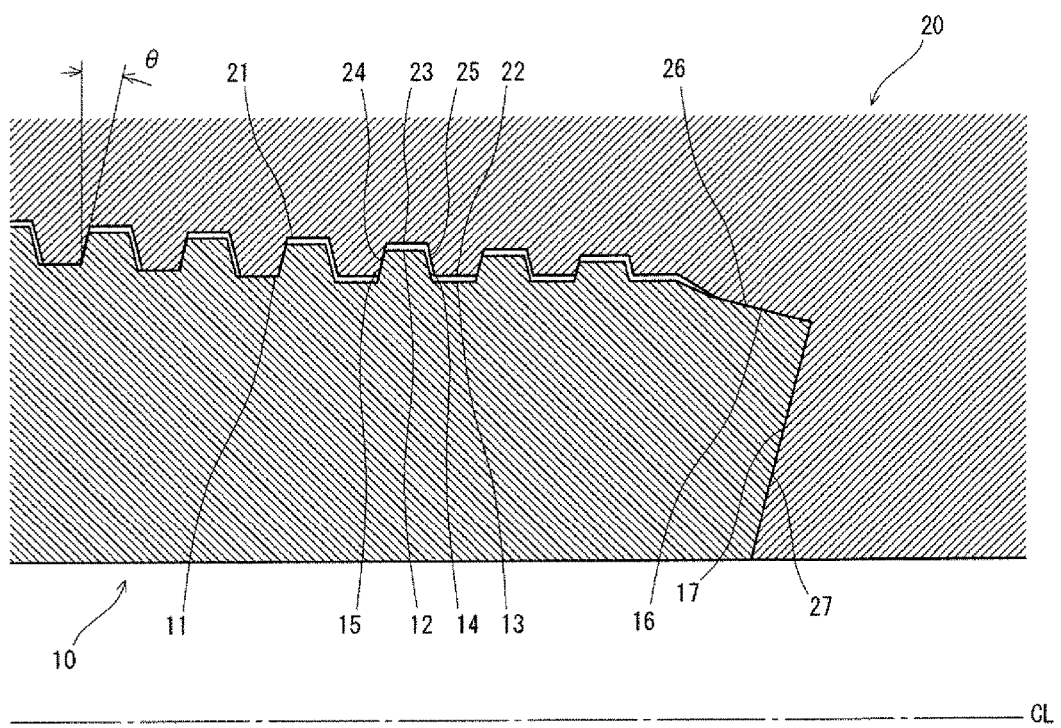
FIG. 2 is a sectional view of a conventional threaded joint for steel pipes disclosed in Patent Literatures 1 and 2, showing a configuration of regions near its seal surfaces.
Figure 3:
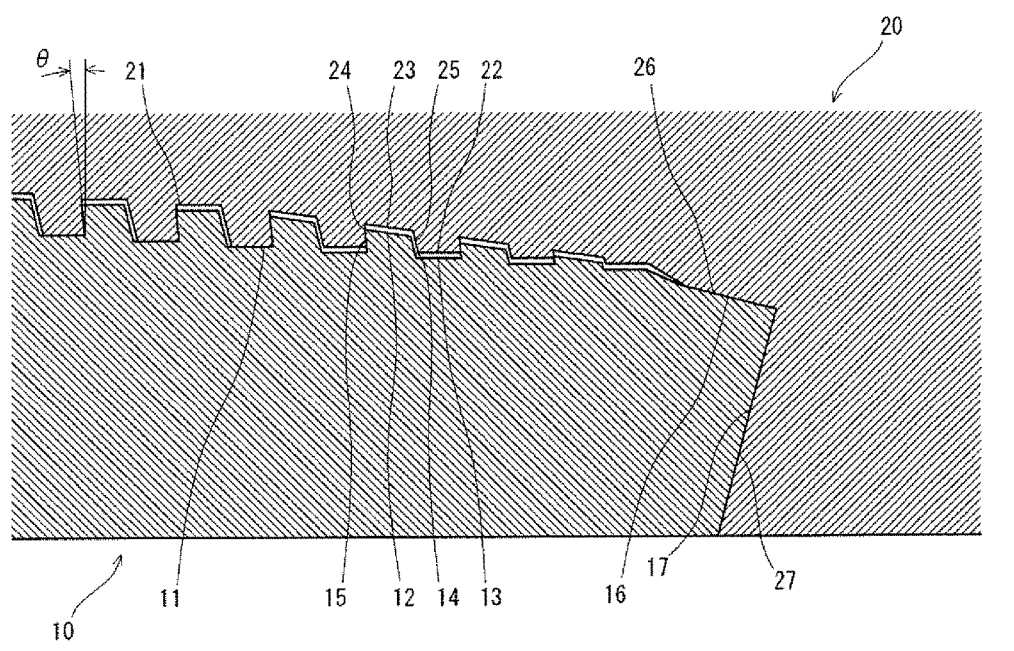
FIG. 3 is a sectional view of a conventional threaded joint for steel pipes disclosed in Patent Literature 3, showing a configuration of regions near its seal surfaces.
Figure 4:
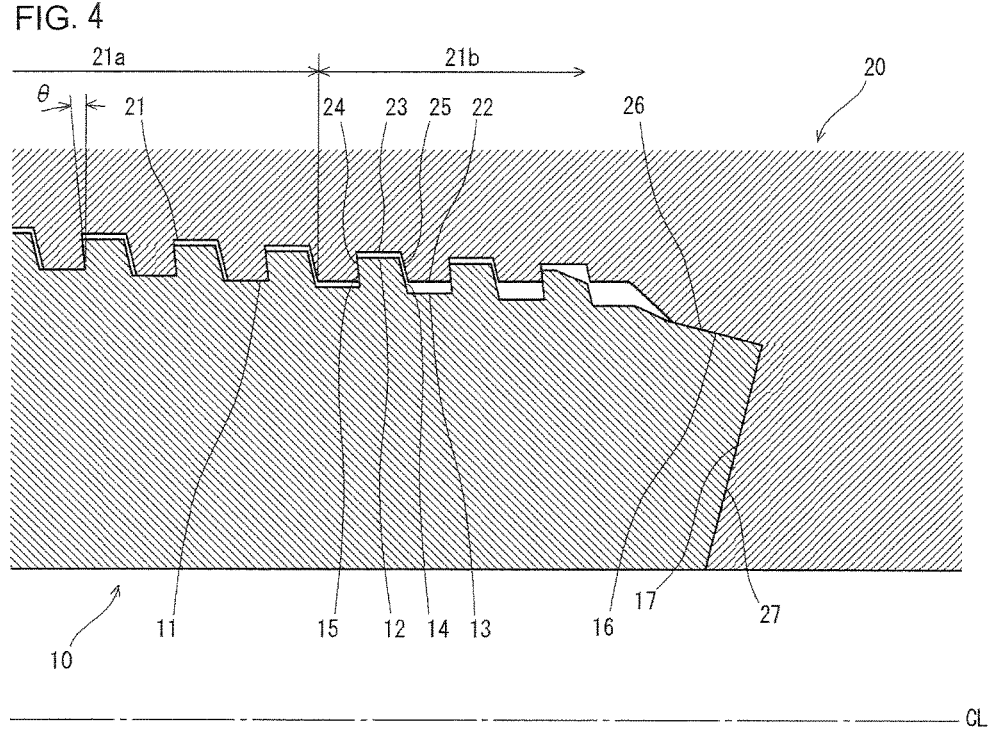
FIG. 4 is a sectional view of a threaded joint for steel pipes according to an embodiment of the present invention, showing a configuration of regions near its seal surfaces.

FIG. 4 is a sectional view of a threaded joint for steel pipes according to an embodiment of the present invention, showing a configuration of regions near its seal surfaces. The threaded joint of the present embodiment has a configuration based on those of the threaded joints shown in FIGS. 1 to 3, while having a flank angle θ of less than 0 degrees at the load flanks 15 in the male threaded portion 11 and the load flanks 24 in the female threaded portion 21. That is, the tapered threads of the threaded joint of the present embodiment are tapered trapezoidal threads having load flanks that are inclined to form a hook shape.

The female threaded portion 21 of the box 20 is divided into, in order from near the seal surface 26, an incomplete thread section 21b and a complete thread section 21a. The incomplete thread section 21b has a length along the pipe axis CL that is at least three times the thread pitch of the female threaded portion 21. In the incomplete thread section 21b, the female threaded portion 21 has a thread height lower than the thread height of the complete thread section 21a. Roots 23 in the incomplete thread section 21b, together with roots 23 in the complete thread section 21a, collectively define a single tapered periphery. That is, the roots 23 in the female threaded portion 21, over the two thread sections 21a, 21b, collectively define a single tapered periphery.

In a made-up state, the shoulder surfaces 17, 27 are in contact with each other, and the seal surfaces 16, 26 are in contact with each other. In both the complete thread section 21a and the incomplete thread section 21b, the load flanks 15 of the male threaded portion 11 are in contact with the load flanks 24 of the female threaded portion 21. It is to be noted that, while in the complete thread section 21a, the roots 13 of the male threaded portion 11 are in contact with the crests 22 of the female threaded portion 21, in the incomplete thread section 21b, which is closer to the seal surfaces 16, 26, clearances are provided between the roots 13 of the male threaded portion 11 and the crests 22 of the female threaded portion 21, so that the mating and intimate contact of the threads is relieved therein.

In the threaded joint according to this embodiment, the flank angle θ of the load flanks is less than 0 degrees, and therefore application of internal pressure does not cause reaction force at the load flanks 15 of the pin 10 acting in a direction to contract the pin 10 radially inward. As a result, the radially outward expansion of the pin 10 is sufficiently caused, and therefore the amplification of the contact pressure between the seal surfaces 16, 26 can be achieved when internal pressure is applied.

Regarding the male threaded portion 11 of the pin 10, its configuration in the area corresponding to the incomplete thread section 21b of the box 20 is similar to that in the area corresponding to the complete thread section 21a thereof. That is, the crests 12 in the male threaded portion 11, over the entire area thereof corresponding to the entire area of the female threaded portion 21 including the incomplete thread section 21b and the complete thread section 21a, collectively define a single tapered periphery. By virtue of this, in the incomplete thread section 21b area, the stiffness of the pin 10 is ensured and the mating of the threads is sufficiently obtained. This results in increasing the deformation resistance of the pin 10 against radial contraction due to application of external pressure, thus making it possible to maintain the sealing performance against external pressure. Moreover, since a sufficient thread height is ensured in the male threaded portion 11 of the pin 10, even in the incomplete thread section 21b area, stable thread mating is achieved during insertion of the pin 10 into the box 20, so that galling is less likely to occur.

The length of the incomplete thread section 21b of the box 20 is at least three times the thread pitch of the female threaded portion 21. The reason for this is as follows. If the length of the incomplete thread section 21b is shorter than three times the thread pitch, the area on which the radially outward expansion of the pin 10 due to internal pressure can act will be smaller. Thus, it will be impossible to cause sufficient radially outward expansion to amplify the contact pressure between the seal surfaces 16, 26.

However, the longer the length of the incomplete thread section 21b is, the further the stiffness of the box 20 is reduced so that the deformation of the box 20 is more likely to occur. Thus, the contact pressure between the seal surfaces 16, 26 under combined loading is decreased. In addition, the substantial total mating area in the threads is reduced. This leads to the risk of the occurrence of the phenomenon in which the pin 10 inadvertently becomes disengaged from the box 20 (jump-out). Accordingly, the length of the incomplete thread section 21b is preferably not more than eight times the thread pitch. The length is more preferably not more than six times the thread pitch, and even more preferably not more than five times the thread pitch.

Furthermore, in the threaded joint of the present embodiment, as described above, the flank angle θ of the load flanks 15 in the male threaded portion 11 and the load flanks 24 in the female threaded portion 21 is less than 0 degrees so as to ensure that the radially outward expansion of the pin 10 due to internal pressure is not interfered with. The flank angle θ, in view of the ease of thread cutting, is preferably—15 degrees or greater, and more preferably—10 degrees or greater although the lower limit therefor is not particularly specified.

For the configuration of the female threaded portion 21 (complete thread section 21a and incomplete thread section 21b) to be provided for the box 20, any of the following configurations (1) to (3) may be employed.

Figure 5:
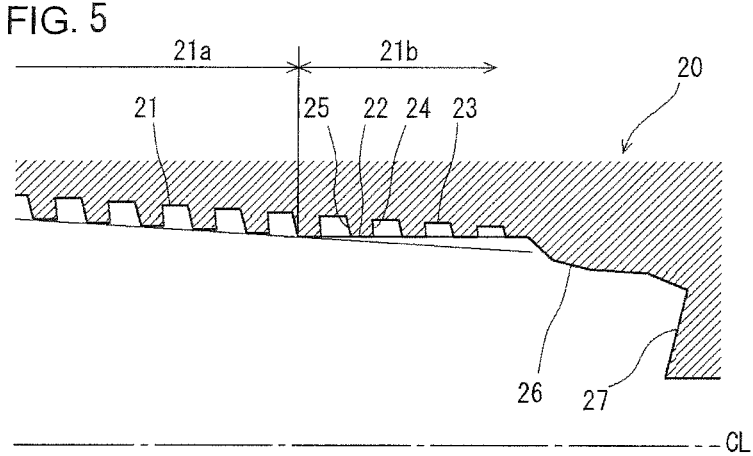
FIG. 5 is a sectional view of the threaded joint for steel pipes according to an embodiment of the present invention, showing an example configuration of the female threaded portion of the box.

(1) FIG. 5 is a sectional view of the threaded joint for steel pipes according to an embodiment of the present invention, showing an example configuration of the female threaded portion of the box. In the female threaded portion 21 shown in FIG. 5, the crests 22 in the incomplete thread section 21b, starting from the boundary between the complete thread section 21a and the incomplete thread section 21b, collectively define a cylindrical periphery that is parallel to the pipe axis CL. Such configuration of the female threaded portion 21 can be easily obtained by appropriately specifying the shape of the prepared hole which is cut in the box 20 in advance prior to thread cutting.

Specifically, as a prepared hole for the complete thread section 21a, a tapered prepared hole that corresponds to the crests 22 of the complete thread section 21a is cut. Then, as a prepared hole for the incomplete thread section 21b, a prepared hole having a cylindrical periphery parallel to the pipe axis CL is cut, starting from the boundary between the thread sections 21a and 21b. Thread cutting may be performed on the thus formed prepared holes in such a manner that the thread taper angle and the thread pitch are maintained constant over the entire area from the complete thread section 21a to the incomplete thread section 21b.

Figure 6:
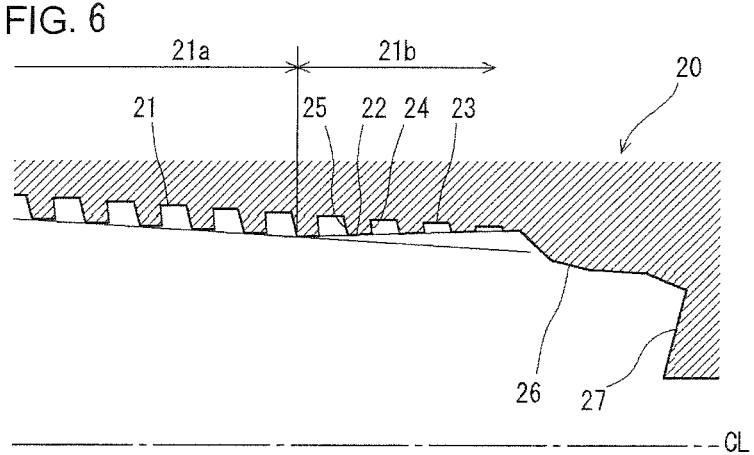
FIG. 6 is a sectional view of the threaded joint for steel pipes according to an embodiment of the present invention, showing another example configuration of the female threaded portion of the box.

(2) FIG. 6 is a sectional view of the threaded joint for steel pipes according to an embodiment of the present invention, showing another example configuration of the female threaded portion of the box. In the female threaded portion 21 shown in FIG. 6, the crests 22 in the incomplete thread section 21b, starting from the boundary between the complete thread section 21a and the incomplete thread section 21b, collectively define a tapered periphery inclined with respect to the pipe axis CL. This configuration of the female threaded portion 21 can be obtained in the following manner. As a prepared hole for the complete thread section 21a, a tapered prepared hole that corresponds to the crests 22 of the complete thread section 21a is cut. Then, as a prepared hole for the incomplete thread section 21b, a tapered prepared hole having a diameter increasing toward the tubular body is cut, starting from the boundary between the thread sections 21a and 21 b. Thread cutting may be performed on the thus formed prepared holes in such a manner that the thread taper angle and the thread pitch are maintained constant over the entire area from the complete thread section 21a to the incomplete thread section 21b.

Figure 7:
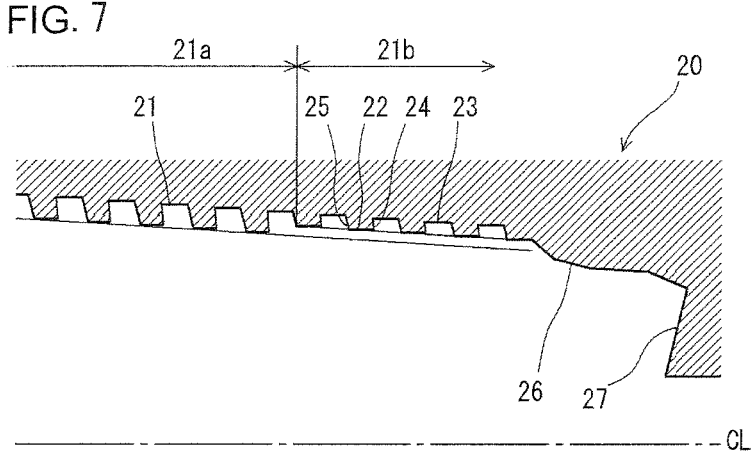
FIG. 7 is a sectional view of the threaded joint for steel pipes according to an embodiment of the present invention, showing yet another example configuration of the female threaded portion of the box.

(3) FIG. 7 is a sectional view of the threaded joint for steel pipes according to an embodiment of the present invention, showing yet another example configuration of the female threaded portion of the box. In the female threaded portion 21 shown in FIG. 7, the crests 22 in the incomplete thread section 21b, starting from the boundary between the complete thread section 21a and the incomplete thread section 21b, collectively define a tapered periphery that is parallel to the thread taper collectively defined by the crests in the complete thread section 21a. This configuration of the female threaded portion 21 can be obtained in the following manner. As a prepared hole for the complete thread section 21a, a tapered prepared hole that corresponds to the crests 22 of the complete thread section 21a is cut. Then, as a prepared hole for the incomplete thread section 21b, a tapered prepared hole having a periphery parallel to the tapered periphery that corresponds to the crests 22 of the complete thread section 21a is cut at a radially outwardly stepped position, starting from the boundary between the thread sections 21a and 21b. Thread cutting may be performed on the thus formed prepared holes in such a manner that the thread taper angle and the thread pitch are maintained constant over the entire area from the complete thread section 21a to the incomplete thread section 21b.

The above configurations (1) and (2) are advantageous in that a step is not formed in the threads at the boundary between the complete thread section 21a and the incomplete thread section 21b. In the meantime, the above configuration (3) is advantageous in that, although a step is formed in the threads at the boundary between the complete thread section 21a and the incomplete thread section 21b, the clearances between the roots 13 of the male threaded portion 11 and the crests 22 of the female threaded portion 21 are constant throughout the incomplete thread section 21b, and therefore regulation of the clearances is facilitated.

In the incomplete thread section 21b, the clearances between the roots 13 of the male threaded portion 11 and the crests 22 of the female threaded portion 21 are configured so that the radially outward expansion of the pin 10 due to internal pressure is not interfered with, depending on the thread taper angle and the thread position along the pipe axis CL. The clearances may be of a height generally equal to or greater than the difference in thread heights (about 0.1 to 0.2 mm, in general) between the male threaded portion 11 of the pin 10 and the female threaded portion 21 of the box 20.

Figure 8:
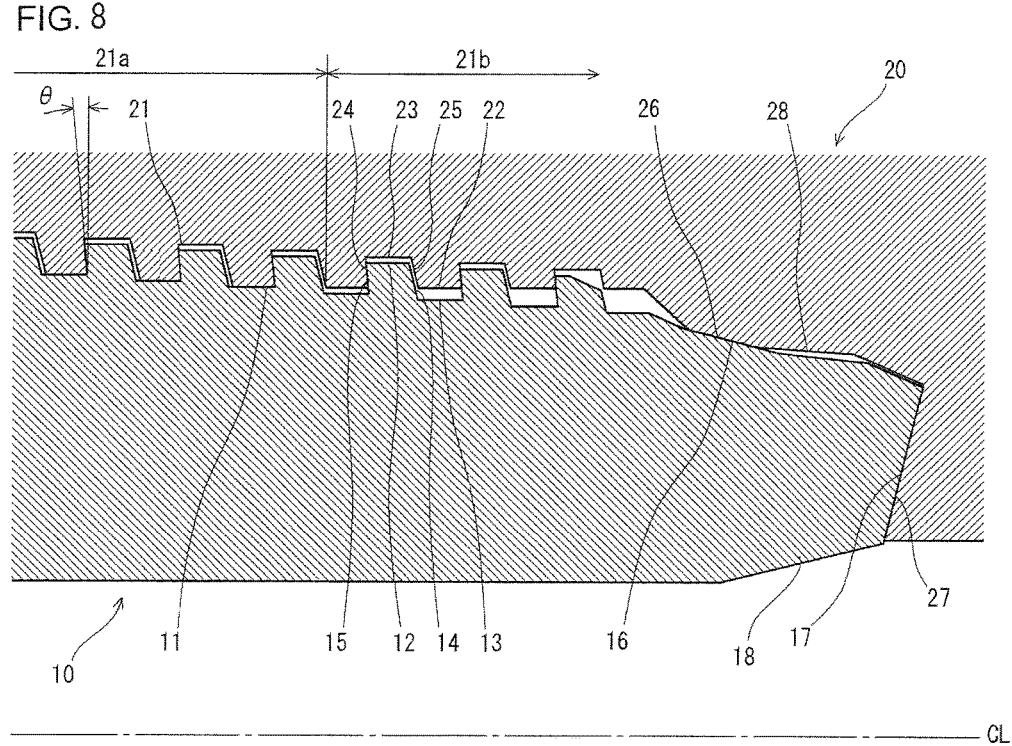
FIG. 8 is a sectional view of the threaded joint for steel pipes according to an embodiment of the present invention, showing a variant configuration of the regions near the seal surfaces.

The present invention is not limited to the embodiments described above, and various modifications may be made without departing from the spirit and scope of the present invention. As shown in FIG. 8, for example, the pin 10 may include, between the seal surface 16 and the shoulder surface 17, a nose portion 18 extending toward the end of the pin, and the box 20 may include a recessed portion 28 that corresponds to the nose portion 18 of the pin 10. In this case, in a made-up state, the nose portion 18 of the pin 10 is not in contact with the recessed portion 28 of the box 20. In a threaded joint having this configuration, the pin 10 exhibits improved stiffness because of the nose portion 18 provided therein. As a result, the sealing performance against external pressure is significantly improved.

Figure 9:
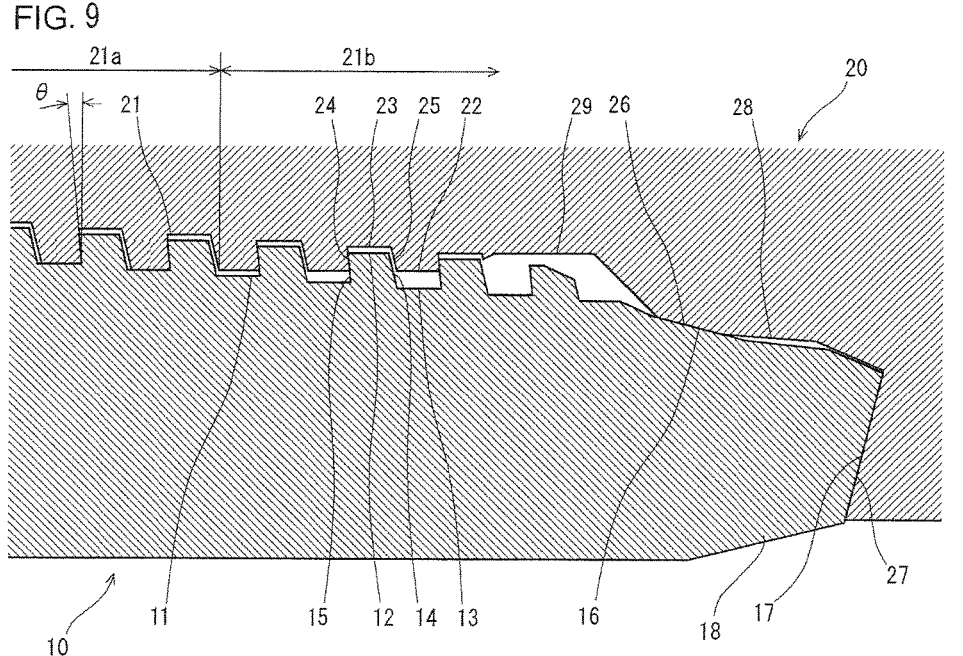
FIG. 9 is a sectional view of the threaded joint for steel pipes according to an embodiment of the present invention, showing another variant configuration of the regions near the seal surfaces.

Furthermore, as shown in FIG. 9, the box 20 may include a circumferential groove 29 disposed between the incomplete thread section 21b and the seal surface 26, and the male threaded portion 11 of the pin 10 may extend to a location corresponding to the circumferential groove 29. When an excessive amount of dope (lubricant) has been applied to the threaded portions, the circumferential groove 29 allows the dope to accumulate therein, thereby inhibiting an abnormal increase in the dope pressure, which results in the advantageous effect of preventing the decrease in the contact pressure between the seal surfaces 16, 26. In this instance, the length of the circumferential groove 29 along the pipe axis CL is at most three times the thread pitch of the female threaded portion 21. The reason for this is as follows.

In addition to the incomplete thread section 21b as described above, the longer the length of the circumferential groove 29 is, the more the area on which the radially outward expansion of the pin 10 due to internal pressure can act is increased, and accordingly the contact pressure between the seal surfaces 16, 26 is amplified. However, when the length of the circumferential groove 29 is too long, the total mating area in the threads is reduced and, as a result, the sealing performance against external pressure tends to decrease. As long as the length of the circumferential groove 29 is not more than three times the thread pitch, almost no adverse effects are produced on the sealing performance against external pressure.

The threaded joint of the present embodiment is configured to have the seal surfaces 16, 26 only on end regions of the threaded portions at the pin free end side. Optionally, aside from the seal surfaces 16, 26, seals for external pressure may be provided on the other end regions of the threaded portions at the opposite end side or on intermediate regions thereof so that the sealing performance against external pressure can be ensured.

Figure 10:
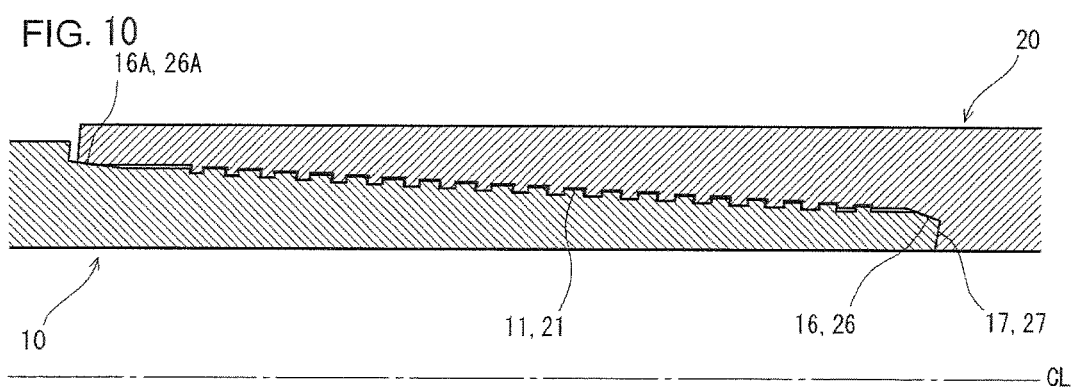
FIG. 10 is a sectional view of a variation of the threaded joint for steel pipes according to an embodiment of the present invention.
Figure 11:
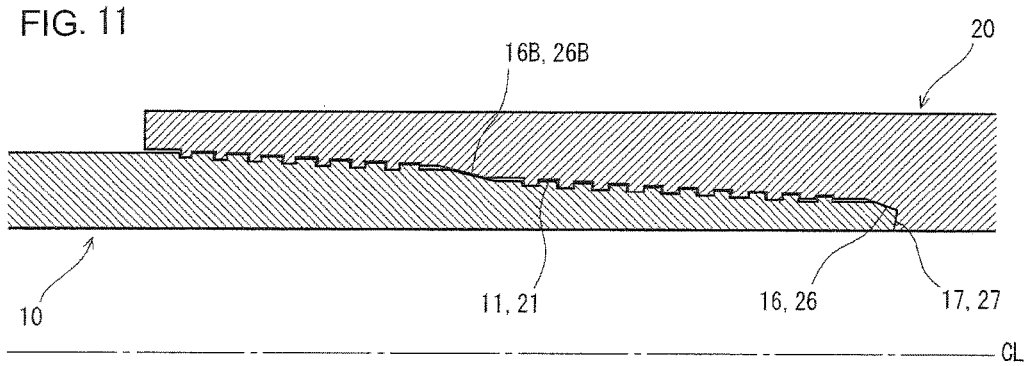
FIG. 11 is a sectional view of another variation of the threaded joint for steel pipes according to an embodiment of the present invention.

Specifically, as shown in FIG. 10, the pin 10 may include a seal surface 16A for external pressure disposed on the opposite end region of the male threaded portion 11, and the box 20 may include a seal surface 26A for external pressure corresponding to the seal surface 16A for external pressure. Alternatively, as shown in FIG. 11, the pin 10 may include a seal surface 16B for external pressure disposed on an intermediate region of the male threaded portion 11, and the box 20 may include a seal surface 26B for external pressure corresponding to the seal surface 16B for external pressure. Alternatively, the seal surfaces 16A, 26A for external pressure on the opposite end regions shown in FIG. 10 may be provided in combination with the seal surfaces 16B, 26B for external pressure on the intermediate regions shown in FIG. 11. In the threaded joint having such seal surfaces 16A, 26A, 16B, and 26B for external pressure, it may occur that, for some reason, external pressure passes through the seal surfaces 16A, 26A, 16B, and 26B and reaches the seal surface 16, 26 for internal pressure. However, even in such a case, the seal surface 16, 26 for internal pressure alternatively provide sealing performance against external pressure.

The threaded joint of the present embodiment may be employed either as an integral-type threaded joint or as a coupling-type threaded joint.

EXAMPLES

To verify the advantages of the present invention, numerical simulation and analysis was carried out using the elasto-plastic finite element method.

[Test Conditions]

In the FEM analysis, models of coupling-type threaded joints, with varied lengths of threaded portions, were prepared. The common conditions were as follows.

Steel pipe size: 8⅝ [inch], 64 [lb/ft] (outside diameter of 219.1 mm and wall thickness of 19.05 mm)

Coupling outside diameter: 235.8 mm

Grade of steel pipe (pin) and coupling (box): API (American Petroleum Institute) standard Q125 (carbon steel having a yield stress of 125 [ksi]).

Thread form: taper of ⅛, thread height of 1.575 [mm], thread pitch of 5.08 [mm], load flank angle of −3 degrees, stabbing flank angle of 10 degrees, and stabbing flank clearance of 0.15 [mm].

In the FEM analysis, the material properties were as follows: isotropic hardening elasto-plastic, a modulus of elasticity of 210 [GPa], and a nominal yield strength, expressed as 0.2% proof stress, of 125 [ksi] (=862 [MPa]). The tightening was carried out to the point where the shoulder surfaces of the pin and the box were brought into contact with each other, and further continued up to a point of 1.0/100 turns.

The varied dimensional conditions are shown in Table 1 below.

TABLE 1

| No. | Length of incomplete thread section of box [mm] | Length of circumferential groove [mm] | Sealing Performance Internal pressure cycle | Sealing Performance External pressure cycle | Total thread mating area | Classification | Evaluation |
|---|---|---|---|---|---|---|---|
| 1 | 0.0 * | 0.0 | 1.00 | 1.00 | 1.00 | Comp. Ex. | Ref. |
| 2 | 9.3 * | 0.0 | 1.01 | 0.99 | 0.95 | Comp. Ex. | Δ |
| 3 | 14.4 * | 0.0 | 1.04 | 0.99 | 0.92 | Comp. Ex. | Δ |
| 4 | 19.5 | 0.0 | 1.22 | 0.99 | 0.88 | Inv. Ex. | ◎ |
| 5 | 24.5 | 0.0 | 1.46 | 0.95 | 0.84 | Inv. Ex. | ◎ |
| 6 | 0.0 * | 15.3 | 0.98 | 0.97 | 0.88 | Comp. Ex. | Δ |
| 7 | 0.0 * | 24.5 | 1.43 | 0.75 | 0.80 | Comp. Ex. | Δ |
| 8 | 16.4 | 10.7 | 1.60 | 0.88 | 0.74 | Inv. Ex. | ◎ |
| 9 | 20.0 | 10.7 | 1.56 | 0.89 | 0.71 | Inv. Ex. | ◎ |
| 10 | 23.6 | 10.7 | 1.48 | 0.91 | 0.68 | Inv. Ex. | ○ |
| 11 | 27.2 | 10.7 | 1.39 | 0.94 | 0.65 | Inv. Ex. | ○ |
| 12 | 30.8 | 10.7 | 1.31 | 0.96 | 0.63 | Inv. Ex. | ○ |

Remarks)
The symbol "*" indicates that the value is outside the range specified by the present invention.

The values in the sealing performance and total thread mating area sections are values relative to values of No. 1, which are assumed to be 1.

Models of Test Nos. 1 to 5 were prepared based on the threaded joint as shown in FIG. 8 and had no circumferential groove in the box. Among them, models of Test Nos. 1 to 3 are comparative examples in which the length of the incomplete thread section of the box does not satisfy the range specified by the present invention (at least three times the thread pitch). Models of Test Nos. 4 and 5 are inventive examples in which the length of the incomplete thread section satisfies the range specified by the present invention.

Models of Test Nos. 6 to 12 were prepared based on the threaded joint as shown in FIG. 9 and had a circumferential groove in the box. Among them, models of Test Nos. 6 and 7 are comparative examples in which the length of the incomplete thread section of the box does not satisfy the range specified by the present invention. Models of Test Nos. 8 to 12 are inventive examples in which the length of the incomplete thread section satisfies the range specified by the present invention.

[Evaluation Method]

In the FEM analysis, load sequence which simulated that in ISO 13679 Series A test was applied to the models in a made-up state. To evaluate the sealing performance of the seal surfaces, the minimum values of average contact pressures at the seal surfaces, in the internal pressure cycle (the first and second quadrants) and the external pressure cycle (the third and fourth quadrants) in the load sequence, were compared. (It is noted that the higher the minimum value of average contact pressure, the better the sealing performance of the seal surfaces.) The evaluations were made in the following manner: provided that the sealing performance against internal pressure and the sealing performance against external pressure of the model of Test No. 1 were each represented by the value 1, evaluations of the remaining models were made by determining values relative to the values of Test No. 1. As the evaluation criterion, the required sealing performance against internal pressure was 1.2 or more, and the required sealing performance against external pressure was 0.85 or more.

Furthermore, the total mating areas in the threads were calculated to evaluate the resistance to jump-out by comparing the total mating areas. The evaluations were made in the following manner: provided that the total mating area of the model of Test No. 1 was represented by the value 1, evaluations of the remaining models were made by determining values relative to the value of Test No. 1. As the evaluation criterion, the required total mating area was at least 0.55, and preferably at least 0.7.

Models that satisfied the evaluation criterion for the sealing performance of the seal surfaces and had a total mating area of 0.55 or more were evaluated as being good (indicated by the symbol "○"), and among them, those having a total mating area of 0.7 or more are evaluated as being excellent (indicated by the symbol "⊚"). Models that did not satisfy the criterion either for the sealing performance of the seal surfaces or for the total mating area were evaluated as being poor (indicated by the symbol "Δ").
[Test Results]

Figure 12:
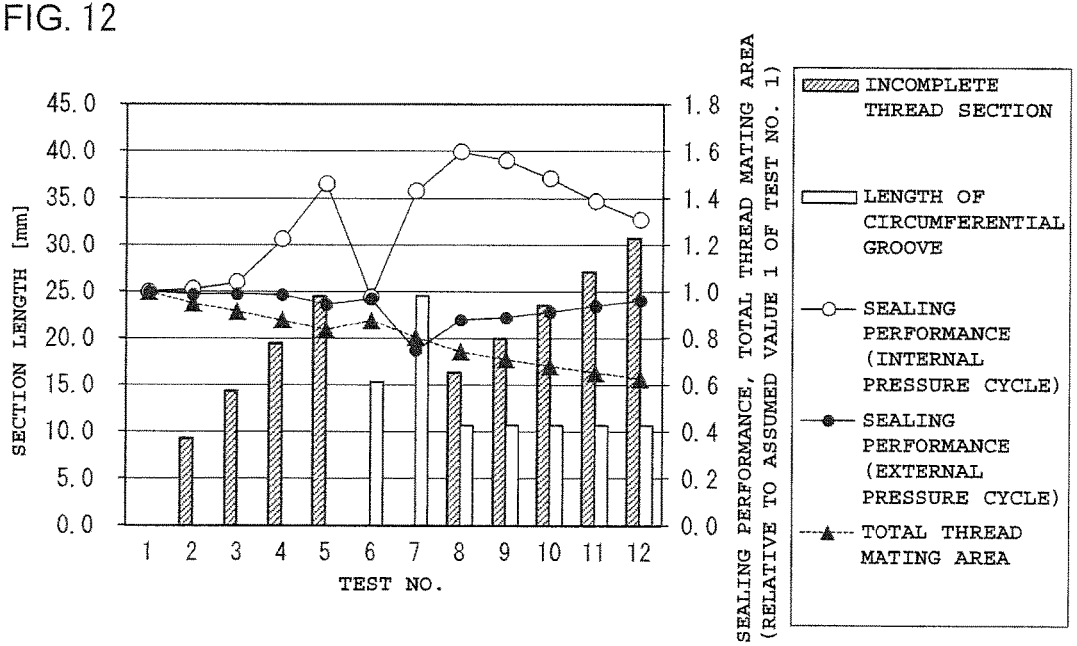
FIG. 12 is a graph showing test results of Examples.

The test results are shown in Table 1 above and FIG. 12 below.

The models of Test Nos. 2, 3, and 6, which are comparative examples, had a shorter incomplete thread section, and therefore sufficient radially outward expansion of the pin was not caused. Thus, there was no improvement in their sealing performances against internal pressure.

The models of Test Nos. 4 and 5, which are inventive examples, exhibited a 20% or more increase in sealing performance against internal pressure because sufficient radially outward expansion of the pin was caused, and also, their sealing performances against external pressure were maintained to be at a high level.

The model of Test No. 7, which is a comparative example, exhibited improved sealing performance against internal pressure. However, it underwent increased radial contraction of the pin when external pressure was applied because its circumferential groove had an excessively long length and thus there was no thread mating in regions near the seal surfaces. Thus, its sealing performance against external pressure decreased by as much as 25%.

The models of Test Nos. 8 to 12, which are inventive examples, exhibited improved sealing performance against internal pressure, and in addition produced the effect of inhibiting an abnormal increase in the dope pressure by virtue of the circumferential grooves.

All of the models of Test Nos. 4, 5, and 8 to 12, which are inventive examples, had, in their boxes, an incomplete thread section having a length in the range of three times the thread pitch to six times the thread pitch, and consequently they had a total mating area in the threads of 0.55 or more. Thus, they are expected to exhibit high resistance to jump-out. Among them, the models of Test Nos. 4, 5, 8, and 9 were most suitable because they had a larger total mating area due to the length of the incomplete thread sections in the box that falls within the range from three times the thread pitch to five times the thread pitch.

The results described above demonstrate that a threaded joint for steel pipes according to the present invention exhibits excellent sealing performance against internal pressure as well as external pressure.

INDUSTRIAL APPLICABILITY

A threaded joint according to the present invention is capable of being effectively utilized in connection of heavy wall steel pipes that are used as oil well pipes in harsh environments.

REFERENCE SIGNS LIST

10: pin, 11: male threaded portion,
12: crest of male threaded portion, 13: root of male threaded portion,
14: stabbing flank of male threaded portion,
15: load flank of male threaded portion,
16: pin seal surface,
16A, 16B: pin seal surfaces for external pressure,
17: pin shoulder surface, 18: nose portion,
20: box, 21: female threaded portion,
22: crest of female threaded portion, 23: root of female threaded portion,
24: load flank of female threaded portion,
25: stabbing flank of female threaded portion,
21a: complete thread section, 21b: incomplete thread section,
26: box seal surface,
26A, 26B: box seal surfaces for external pressure,
27: box shoulder surface, 28: recessed portion, 29: circumferential groove,
θ: flank angle of load flanks, CL: pipe axis

The invention claimed is:
1. A threaded joint for steel pipes, comprising: a tubular pin and a tubular box, the pin and the box being made up by screwing the pin onto the box,
   the pin comprising: in order from an end of the pin, a shoulder surface; a seal surface; and a male threaded portion, the male threaded portion being a tapered threaded portion with trapezoidal threads,
   the box comprising: a shoulder surface corresponding to the shoulder surface of the pin; a seal surface corresponding to the seal surface of the pin; and a female threaded portion corresponding to the male threaded portion of the pin, the female threaded portion being a tapered threaded portion with trapezoidal threads,
   the male threaded portion including: crests; roots; stabbing flanks; and load flanks, the stabbing flanks being in a leading position in the screwing of the male threaded portion into the female threaded portion, the load flanks being located opposite from the stabbing flanks,
   the female threaded portion including: roots facing the crests of the male threaded portion; crests facing the roots of the male threaded portion; stabbing flanks facing the stabbing flanks of the male threaded portion; and load flanks facing the load flanks of the male threaded portion,
   the load flanks of the male threaded portion and the load flanks of the female threaded portion having a flank angle that is less than 0 degrees, the female threaded portion being composed of: in order from near the seal surface of the box, an incomplete thread section; and a complete thread section, wherein:

in the female threaded portion, over an entire area thereof including the incomplete thread section and the complete thread section, the roots collectively define a single tapered periphery having a single taper angle over the entire area including the incomplete thread section and the complete thread section, the incomplete thread section has a length along the pipe axis, the length being at least three times a thread pitch of the female threaded portion, and the incomplete thread section has a thread height lower than a thread height of the complete thread section, and in a made-up state: the shoulder surfaces are in contact with each other, and the seal surfaces are in contact with each other; in the complete thread section, the roots of the male threaded portion are in contact with the crests of the female threaded portion, and the load flanks of the male threaded portion are in contact with the load flanks of the female threaded portion; and in the incomplete thread section, clearances are provided between the roots of the male threaded portion and the crests of the female threaded portion, and the load flanks of the male threaded portion are in contact with the load flanks of the female threaded portion.

2. The threaded joint for steel pipes according to claim 1, wherein:

the length of the incomplete thread section along the pipe axis is at most eight times the thread pitch of the female threaded portion.

3. The threaded joint for steel pipes according to claim 1, wherein:

the incomplete thread section has one of the following configurations: a configuration in which the crests, starting from a boundary between the complete thread section and the incomplete thread section, collectively define a cylindrical periphery that is parallel to the pipe axis; and a configuration in which the crests, starting from the boundary, collectively define a tapered periphery inclined with respect to the pipe axis.

4. The threaded joint for steel pipes according to claim 1, wherein:

the incomplete thread section has a configuration in which the crests, starting from a boundary between the complete thread section and the incomplete thread section, collectively define a tapered periphery that is parallel to a tapered periphery collectively defined by the crests in the complete thread section.

5. The threaded joint for steel pipes according to claim 1, wherein:

in the male threaded portion, over an entire area thereof corresponding to the incomplete thread section and the complete thread section of the female threaded portion, the crests collectively define a single tapered periphery.

6. The threaded joint for steel pipes according to claim 1, wherein:

the pin includes a nose portion disposed between the seal surface and the shoulder surface, the box includes a recessed portion corresponding to the nose portion of the pin, and in a made-up state, the nose portion of the pin is not in contact with the recessed portion of the box.

7. The threaded joint for steel pipes according to claim 1, wherein:

the box includes a circumferential groove disposed between the incomplete thread section and the seal surface, the circumferential groove having a length along the pipe axis, the length being at most three times the thread pitch of the female threaded portion; and the male threaded portion of the pin extends to a location corresponding to the circumferential groove.

8. The threaded joint for steel pipes according to claim 1, wherein:

the pin includes a seal surface for external pressure, the seal surface for external pressure being disposed on at least one of an end region of the male threaded portion and an intermediate region thereof, and the box includes a seal surface for external pressure corresponding to the seal surface for external pressure of the pin.

* * * * *